United States Patent [19]
Szentmihaly et al.

[11] 3,990,729
[45] Nov. 9, 1976

[54] END FITTING FOR HOSES

[75] Inventors: Charles Szentmihaly; Stanley Harold Goward, both of Salisbury, England

[73] Assignee: BTR Industries Limited, London, England

[22] Filed: Feb. 28, 1975

[21] Appl. No.: 554,013

[30] Foreign Application Priority Data
Mar. 7, 1974 United Kingdom............... 10335/74

[52] U.S. Cl................................ 285/109; 285/111; 285/256; 285/259
[51] Int. Cl.² ..................... F16L 17/00; F16L 33/20
[58] Field of Search ........... 285/259, 111, 149, 256, 285/258, 244, 109

[56] References Cited
UNITED STATES PATENTS

| | | | |
|---|---|---|---|
| 331,170 | 11/1885 | Thompson .......................... | 285/109 |
| 1,490,716 | 4/1924 | Schwennker..................... | 285/111 X |
| 2,165,052 | 7/1939 | Hering ................................ | 285/111 |
| 2,340,852 | 2/1944 | Wormeley...................... | 285/259 X |
| 2,453,997 | 11/1948 | MacWilliam..................... | 285/259 X |
| 2,733,941 | 2/1956 | Trevaskis ........................ | 285/256 X |
| 2,750,210 | 6/1956 | Trogdon et al. ................. | 285/149 X |
| 2,753,196 | 7/1956 | Melsom ............................. | 285/149 |
| 3,799,586 | 3/1974 | Caras et al..................... | 285/111 X |

FOREIGN PATENTS OR APPLICATIONS

| | | | |
|---|---|---|---|
| 78,014 | 5/1955 | Netherlands........................ | 285/109 |
| 581,204 | 10/1946 | United Kingdom................ | 285/149 |
| 955,498 | 4/1964 | United Kingdom................ | 285/149 |

*Primary Examiner*—Thomas F. Callaghan
*Attorney, Agent, or Firm*—Watson, Cole, Grindle & Watson

[57] ABSTRACT

The specification discloses an end fitting for a tubular hose which fitting comprises a rigid tubular insert to be inserted within at least one layer of the hose, a ferrule to surround at least a portion of the insert to grip the said layer of the hose between the ferrule and the insert, an annular sealing member of resilient material, for example rubber or soft thermoplastic, having a first annular lip to make a lip seal with an inner wall of the hose and a second annular lip to make a lip seal with an annular surface on the insert and spring means to maintain the lips in initial contact with the hose and the insert until sufficient pressure builds up in the hose to form lip seals between the lips and the hose and the insert.

4 Claims, 4 Drawing Figures

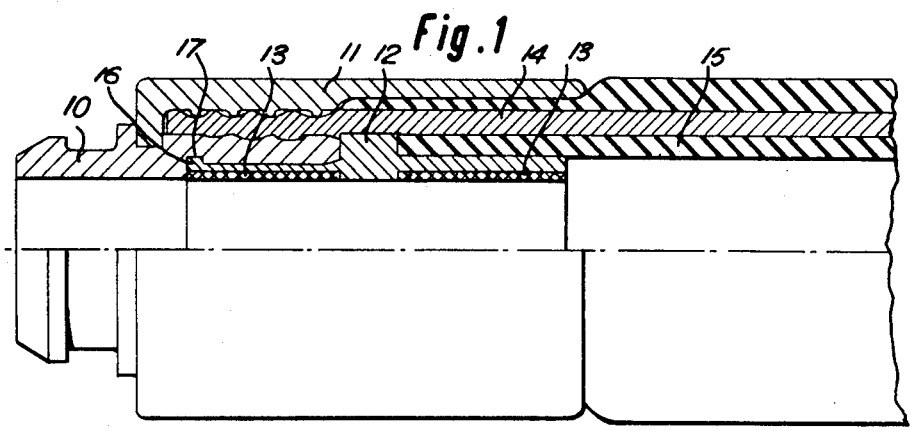
Fig. 1
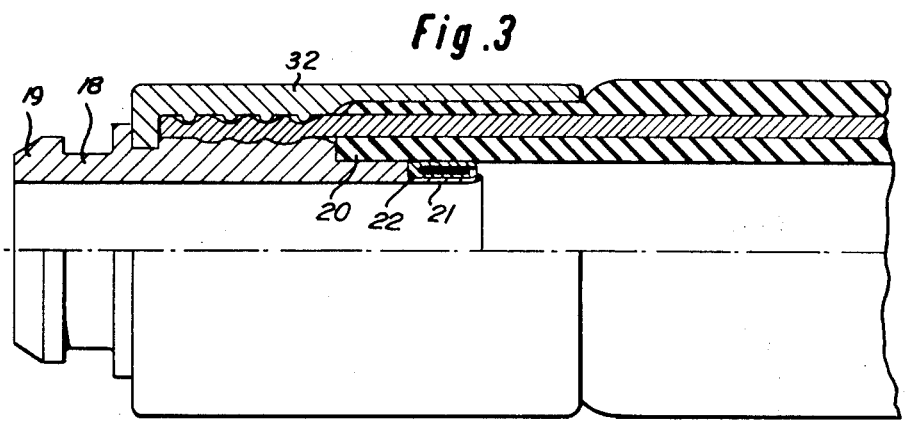
Fig. 3
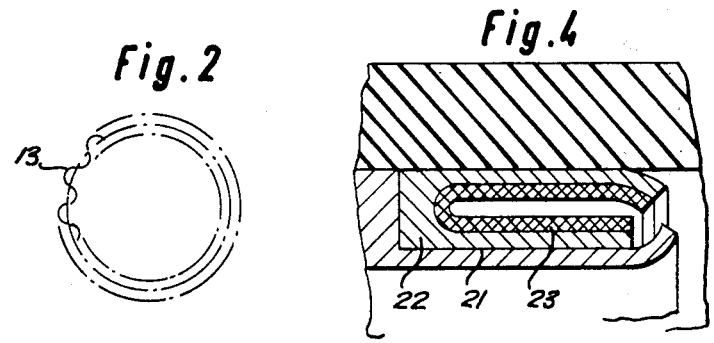
Fig. 2
Fig. 4

END FITTING FOR HOSES

BACKGROUND TO THE INVENTION

In flexible hose couplings used hitherto, the end fitting is sealed to the hose by swaging the ferrule inwardly to radially compress the hose lining which is made of resilient material against the insert whereby a compressive stress is induced in the liner material. It is also known to provide an elastomeric sealing member which is compressed against the hose liner and the insert. However, when such coupling components are so sealed and are subjected to high temperatures in use the result is the displacement of the elastomeric material without subsequent elastic recovery so that the efficiency of the seal is impaired due to the decay of the compressive stress level in the elastomeric material.

SUMMARY OF THE INVENTION

The invention provides an end fitting for a hose which fitting comprises a rigid tubular insert to be inserted within at least one layer of the hose, a ferrule to surround at least a portion of the insert to grip the said layer of the hose between the ferrule and the insert, an annular sealing member of resilient material, for example rubber or soft thermoplastic, having a first annular lip to make a lip seal with an inner wall of the hose and a second annular lip to make a lip seal with an annular surface on the insert and spring means to maintain the lips in initial contact with the hose and the insert until sufficient pressure builds up in the hose to form lip seals between the lips and the hose and the insert.

Preferably the material of the spring means is such that the spring means maintains the initial contact of the lips with the hose and insert under widely varying temperature conditions, for example, 40° to 150° C during the working life of a hose.

In arrangements where the insert stops short of the innermost layer of the hose, the sealing member may have tubular portions for extending within the innermost layer of the hose and the insert respectively, the spring means being operative to press said portion of the sealing member radially outwards. In such arrangements, said spring means may comprise annular spring elements which can be resiliently compressed radially inwards to fit within said tubular portions of the sealing member. Said spring elements may be corrugated in the circumferential direction.

In arrangements where the insert extends within the innermost layer of the hose, the sealing member may comprise an annulus which is U-shaped in cross-section with the outer arm of the U for sealing with the innermost layer of the hose and the inner arm of the U for sealing with the insert, and the spring means located between the arms of the U to bias the arms away from one another.

In such arrangements the spring means may comprise an annular spring member of U-shaped cross-section which is located between the arms of the U-section sealing member.

Preferably the said one layer is a reinforcement layer.

BRIEF DESCRIPTION OF THE DRAWINGS

FIG. 1 is a section through an end portion of a hose having an end fitting embodying the invention comprising an insert, a ferrule, an elastomeric sealing member and springs biassing the sealing member;

FIG. 2 is a cross-sectional detail of one of the springs of the end fitting shown in FIG. 1;

FIG. 3 is a section through an end portion of a hose having a second embodiment of an end fitting according to the invention including a sealing member and an internal spring device; and FIG. 4 is a cross-sectional detail of the sealing member and spring device of the end fitting shown in FIG. 3.

DETAILED DESCRIPTION

Referring to FIGS. 1 and 2, an end fitting providing a part of high pressure flexible hose coupling comprises a rigid tubular insert 10, a ferrule 11, and an elastomeric sealing member 12 having spring elements 13. The insert 10 extends within a bared portion of a reinforcing layer 14 of the hose but stops short of the inner lining 15 of the hose. The ferrule 11 is swaged radially inwards to grip the reinforcing layer 14 between the ferrule and the insert 10. The annular sealing member 12 comprises a central enlarged portion of rectangular cross-section and two integral tubular portions extending in opposite axial directions from the central enlarged portion, one extending into the bore of the insert and the other extending within the inner liner 15 of the hose. The free end of one of the tubular portions of the sealing member 12 has an outwardly extending annular flange 16 which engages in an internal groove 17 in the bore of the insert to axially locate the member 12 with respect to the insert with the annular end surface of the enlarged central portion of the member 12 in contact with an axial end surface of the insert. The two annular members 13 of shim steel, which are corrugated circumferentially as shown in FIG. 2, are located within the tubular portions of the member 12 to radially expand those portions into sealing contact with the bore of the insert and the inner lining of the hose. The radial pressure exerted by spring 13 provides an initial contact pressure between the tubular portions of the sealing member 12, and the hose lining 13, and the insert 10, respectively. When the hose is subjected to internal fluid pressure, the fluid pressure will be transmitted radially outwards through the sealing member 12, providing lip seals at the interface between sealing member 12 and the inner liner 15 of the hose, and between the sealing member 12 and the insert 10 respectively to prevent escape of hydraulic fluid.

Referring to FIGS. 3 and 4, there is shown an end fitting having a tubular insert 18 having a nipple 19 at one end and an annular recess 20 in its outer periphery at the other end of the insert. The outer periphery of the insert is further reduced immediately adjacent the right hand end of the insert, as viewed in FIG. 3, to provide a further annular recess 21. The bared hose liner is gripped between the ferrule 32 and the insert 18 by swaging the ferrule inwardly as in the construction shown in FIG. 1. The inner lining of the hose is received in the recess 20 of the insert. An annular elastomeric sealing member 22 of U-shaped cross-section is located in the recess 21. An annular metallic spring element 23 of U-shaped cross-section is located between the arms of the U of the member 22 with outer surface of the element 23 corresponding to and in engagement with the inner surface of the member 22. The element 23 presses the arms of the member 22 into initial sealing contact with the hose lining and the insert respectively until the build up of pressure within the hose when lip seals are provided as in the previous example. The free edge of the insert is flared outwardly to axially locate the member 22 in the recess 21 and the free edges of the outer arms of the sealing member 22 and spring element 23 are turned radially inwardly to locate the element 23 within the member 22.

The advantage of the above described embodiments of the invention is that the spring element, acting on the resilient sealing member maintains a contact pressure for cyclic conditions of widely varying temperature and pressure levels during the service life of the hose element. The sealing pressure during pressurisation of the flexible hose is the resultant pressure of the initial contact pressure resulting from an initial compression of the sealing element, and the actual fluid pressure. For example if the initial pressure is, say, 50 p.s.i. and the fluid pressure is 1,000 p.s.i., then the sealing pressure at the interface will be 1,050 p.s.i. and basically this will achieve the sealing of the end fitting.

If desired in each of the examples the sealing member 12 or 22 may be bonded to the insert 10 or 18.

We claim:

1. An end fitting for a tubular hose having an inner lining and a second layer surrounding the lining which fitting comprises a rigid tubular insert to be inserted within the second layer of the hose, a ferrule to surround at least a portion of the insert to grip the said second layer of the hose between the ferrule and the insert, an annular sealing member of resilient material having a first tubular portion defining a lip seal with the inner lining of the hose and a second tubular portion defining a lip seal with an annular surface within the insert, said tubular portions being undercut at the inner surfaces thereof from opposite ends and defining spaced shoulders at the middle portion of said sealing member, and spring means to maintain the portions in initial contact with the hose and the insert until sufficient pressure builds up in the hose to form lip seals between the portions and the hose and the insert, said spring means comprising two separate and independently acting tubular members located wholly within said undercut inner surfaces of said tubular portions so as to extend from said opposite ends into abutting engagement with said shoulders, and said tubular members being expandable outwardly to exert radially outward pressure on the tubular portions, whereby the sealing pressure is increased at the interfaces between said inner lining and said insert annular surface and said tubular portions, respectively.

2. An end fitting as claimed in claim 1 in which the spring members are corrugated in the circumferential direction.

3. An end fitting as claimed in claim 1 in which the said second layer is a reinforcement layer.

4. An end fitting as claimed in claim 1 in which the sealing member is bonded to the insert.

* * * * *